US011444463B2

(12) United States Patent
Rafsanjan et al.

(10) Patent No.: US 11,444,463 B2
(45) Date of Patent: *Sep. 13, 2022

(54) LOW VOLTAGE, LOW FREQUENCY, MULTI LEVEL POWER CONVERTER

(71) Applicant: JABIL INC., St. Petersburg, FL (US)

(72) Inventors: Salman Talebi Rafsanjan, St. Petersburg, FL (US); David Michael Eckerson, St. Petersburg, FL (US)

(73) Assignee: JABIL INC., St. Petersburg, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/129,350

(22) Filed: Dec. 21, 2020

(65) Prior Publication Data

US 2021/0184467 A1 Jun. 17, 2021

Related U.S. Application Data

(63) Continuation of application No. 16/548,502, filed on Aug. 22, 2019, now Pat. No. 10,873,187, which is a
(Continued)

(51) Int. Cl.
*H02J 3/38* (2006.01)
*H02M 7/49* (2007.01)
(Continued)

(52) U.S. Cl.
CPC .............. *H02J 3/385* (2013.01); *H02J 3/38* (2013.01); *H02J 3/387* (2013.01); *H02J 7/00* (2013.01);
(Continued)

(58) Field of Classification Search
CPC ..................................................... H02J 3/385
See application file for complete search history.

(56) References Cited

U.S. PATENT DOCUMENTS 8,842,454 B2 * 9/2014 Johnson .................. H02M 7/49
363/71
10,431,989 B2 * 10/2019 Rafsanjan ............... H02J 3/385
(Continued)

FOREIGN PATENT DOCUMENTS

JP 2009064809 A 3/2009
JP 2013172616 A 9/2013

OTHER PUBLICATIONS

International Search Report for PCT/US2017/013811, dated Apr. 20, 2017.
(Continued)

*Primary Examiner* — Jeffrey M Shin
(74) *Attorney, Agent, or Firm* — Thomas J. McWilliams; Barnes & Thornburg LLP

(57) ABSTRACT

A low voltage, low frequency multi-level power converter capable of power conversion is disclosed. The power converter may include a low voltage, low frequency circuit that includes a plurality of phase-shifting inverters in series; a plurality of low voltage source inputs, and a plurality of phase-shifting inverters in series. Each of the plurality of phase-shifting inverters may be configured to receive at least one of the plurality of low voltage source inputs; and generate at least one square wave output. A semi-sine wave output may be derived from the generated at least one square wave output.

20 Claims, 14 Drawing Sheets

Related U.S. Application Data continuation of application No. 15/408,219, filed on Jan. 17, 2017, now Pat. No. 10,431,989.

(60) Provisional application No. 62/291,333, filed on Feb. 4, 2016, provisional application No. 62/278,832, filed on Jan. 14, 2016.

(51) Int. Cl.

| | | |
|---|---|---|
| *H02S 40/32* | (2014.01) | |
| *H02J 7/00* | (2006.01) | |
| *H02M 1/12* | (2006.01) | |
| *H02M 7/5387* | (2007.01) | |
| *H02M 3/158* | (2006.01) | |
| *H02M 1/00* | (2006.01) | |

(52) U.S. Cl.
CPC ............... *H02M 1/12* (2013.01); *H02M 7/49* (2013.01); *H02M 7/5387* (2013.01); *H02S 40/32* (2014.12); *H02M 1/007* (2021.05); *H02M 3/1582* (2013.01)

(56) References Cited

U.S. PATENT DOCUMENTS

| | | | |
|---|---|---|---|
| 10,873,187 B2* | 12/2020 | Rafsanjan | ............... H02J 3/385 |
| 2015/0021998 A1* | 1/2015 | Trescases | .................. H02J 7/02 |
| | | | 307/46 |
| 2015/0200603 A1 | 7/2015 | Nam et al. | |

OTHER PUBLICATIONS

Written Opinion of the International Searching Authority for PCT/US2017/013811, dated Apr. 20, 2017.
International Preliminary Report on Patentability for PCT/US2017/013811, dated Jul. 17, 2018.
Xiaohu Zhang, , Master of Science Thesis in Power Electronics at the School of Electrical Engineering Royal Institute of Technology Stockholm, Sweden, Jun. 2011, pp. 1-54. See pp. 1-30 and figures 1.1-4.9.
Ahmed A.A. Hafez, "Multi-Level Cascaded DC/DC Converters for PV Application", Alexandria Engineering Journal, vol. 54, Issue 4, Oct. 6, 2015, pp. 1135-1146, See pp. 1135-1137 and figures 1-4.

* cited by examiner $$a1i = \frac{2Vi}{\pi}(\sin(\alpha i2 - \alpha i1)$$

$$b1i = \frac{2Vi}{\pi}(\cos(\alpha i1 - \alpha i2)$$

$$a1 = \sum_{i=1}^{14} a1i \qquad \text{Number of PV Panels (Assumed): 14}$$

$$b1 = \sum_{i=1}^{14} b1i$$

$$V1rms = \sqrt{(a1^2 + b1^2)}/\sqrt{2}$$

$$Vrms = \sqrt{\frac{1}{\pi}\int_0^\pi V_{MLI}(\theta)^2 d\theta} = \sum_{j=1}^{28} V_{MLI}{}^2(\Delta\alpha)$$

$$THD = \sqrt{(\frac{Vrms}{V1rms})^2 - 1}$$

LOW VOLTAGE, LOW FREQUENCY, MULTI LEVEL POWER CONVERTER

CROSS-REFERENCE TO RELATED APPLICATION

This application is a Continuation Application of U.S. application Ser. No. 16/548,502, filed Aug. 22, 2019, entitled: LOW VOLTAGE, LOW FREQUENCY, LOW FREQUENCY, MULTI-LEVEL POWER CONVERTER, which claims the benefit of priority to U.S. application Ser. No. 15/408,219, filed Jan. 17, 2017, entitled LOW VOLTAGE, LOW FREQUENCY, MULTI LEVEL POWER CONVERTER, which claims the benefit of priority to U.S. Provisional Application No. 62/291,333 and U.S. Provisional Application No. 62/278,832, both entitled LOW VOLTAGE, LOW FREQUENCY, MULTI LEVEL POWER CONVERTER, the entirety of both of which are incorporated herein by reference as if set forth in their entireties.

FIELD OF THE DISCLOSURE

The present disclosure is directed generally to power conversion, such as solar inverters and battery coupled inverters/chargers, and more particularly is directed to a low voltage, low frequency, multi-level power converter.

SUMMARY

According to certain embodiments of the present disclosure, a low voltage, low frequency multi level power converter (LV LF MLPC) apparatus and method for power conversion (i.e., DC/AC or AC/DC) may be provided. The present disclosure may use low voltage, low cost, high performance components (e.g. MOSFETs, diodes, capacitors, inductors, resistors, etc.) and may drive the power devices (e.g. MOSFETs and diodes) at low frequency (e.g., utility frequency) to generate a desired voltage and current wave (e.g., a semi-sine wave at 220Vrms/50 Hz or 240Vrms/60 Hz) for an AC load. As a result, the present disclosure may provide several advantages, such as low cost, high efficiency, low environmental impact (e.g. low THD, low EMI, low leakage current etc.), high reliability, and safety standard compliance.

LV LF MLPC may be used in certain embodiments to convert electricity from a power source (e.g., a photovoltaic (PV) panel, battery, fuel cell, etc.) to a load (e.g., public utility or any other AC loads). The individual LV LF power converters (LV LF PC) may be integrated with power sources, such as in PV panels or battery modules, such as to make integrated AC modules. A number of AC modules may be connected in series to make a LV LF MLPC system, by way of example.

By way of non-limiting example, a LV LF MLPC and power conversion system as described herein may be applied to a wide variety of systems, from residential to commercial, industrial to utility scale, and such as, by way of non-limiting example, as grid-tied solar inverters, off-grid solar inverters, solar battery coupled inverters, grid-tied battery chargers, etc. Further, depending on the geographic region of application (e.g., US, Europe, etc.), the input power source (solar, battery, etc.), the load (single/three phase public utility, AC loads, etc.), and the desired power level, the LV LF MLPC system may be any type of a 3-phase/1-phase, PFC/non-PFC, or the like.

By way of non-limiting example, the disclosed LV LF MLPC may create a 240 Vrms, 60 Hz voltage wave by adding a predetermined number, such as up to 14, series low voltage (e.g. 24.2Vdc), low frequency (e.g. 60 Hz), and phase shifted power sources. The power sources may be from a PV panel in conjunction with a DC/DC optimizer, or from a battery in conjunction with a bidirectional DC/DC charger, by way of example.

By way of non-limiting example, in the solar inverter industry and in comparison with existing solutions (e.g. AC micro-inverters, power optimizers and string inverters), the disclosed LV LF MLPC is lower cost and uses lower voltage with more efficient components. It may also eliminate the need for an isolation transformer, and may dissipate less power in switching intervals due to very lower switching frequency and lower device blocking voltages during typical operation.

Disclosed embodiments may also use series cabling, which eliminates the need for an expensive bus connector system. Further, in comparison with DC power optimizers, the disclosed LV LF MLPC may result in large system cost savings due to elimination of a string inverter (to which is often allocated a large portion of the system cost). Also, disclosed embodiments may result in higher overall system efficiency than in the known art, such as due to avoiding high voltage devices and switching at high frequency at the inverting stage.

In comparison with previously known string inverters, the disclosed LV LF MLPC may benefit from module level control, which may ultimately be required by National Electric Code (NEC) and Underwriters Laboratories (UL), and may also benefit from module level Maximum Power Point Tracking (MPPT), which utilizes the PV panels at their most efficient operating point. Embodiments also may result in overall cost saving and efficiency improvements by avoiding the need for various additional high voltage components.

Accordingly, certain of the embodiments may provide a low voltage, low frequency multi-level power converter that may include a low voltage, low frequency circuit that includes a plurality of low voltage source inputs; and a plurality of phase-shifting inverters in series. Each of the plurality of phase-shifting inverters may be configured to receive at least one of the plurality of low voltage source inputs; and generate at least one square wave output. A semi-sine wave output may be derived from the generated at least one square wave output.

BRIEF DESCRIPTION OF THE FIGURES

Referring now to the figures incorporated herein, shown are non-limiting embodiments of the present disclosure, wherein like numerals represent like elements, and wherein.

DETAILED DESCRIPTION

Figure 1A:
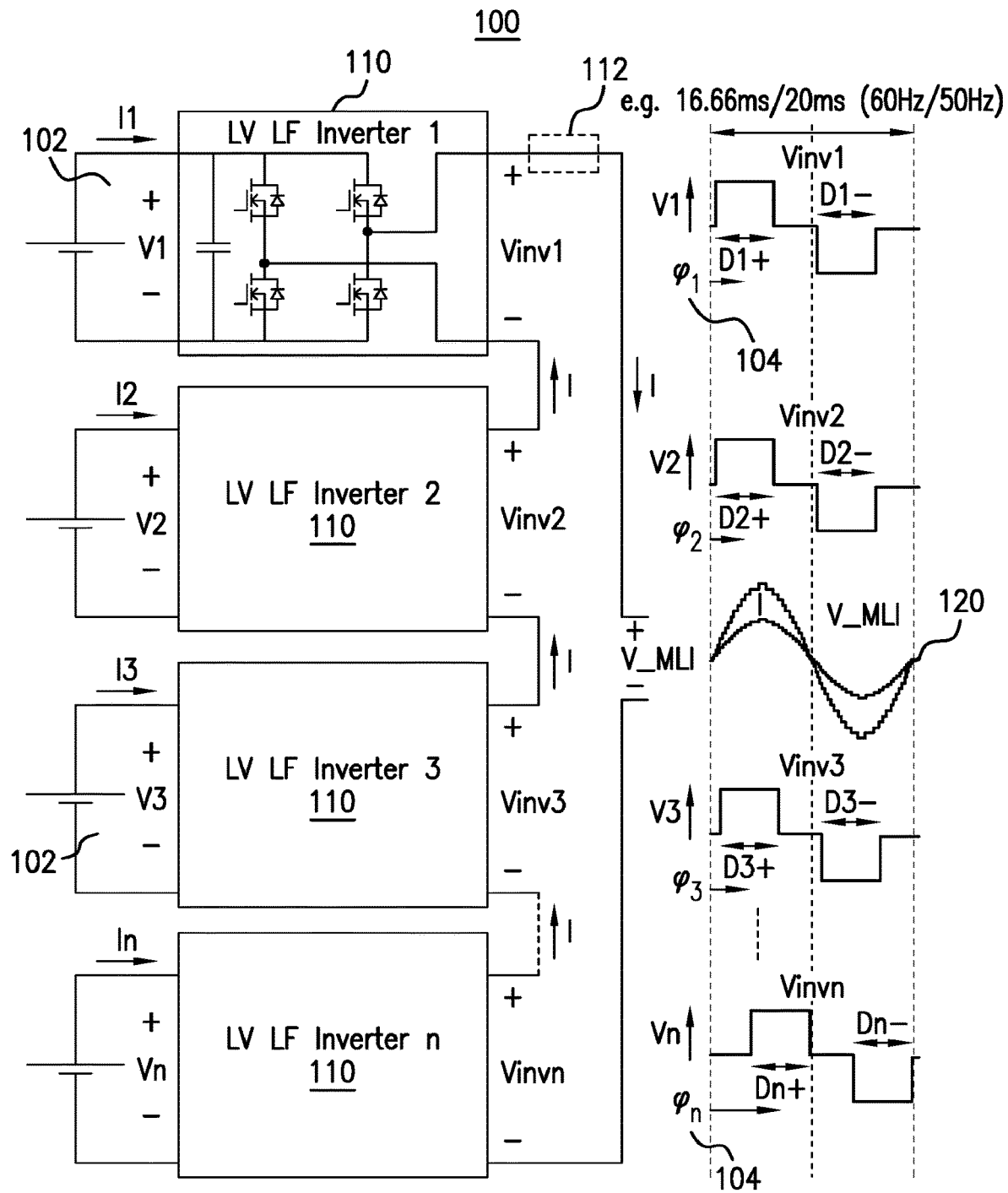
FIG. 1A shows a block diagram of a square wave based LV LF MLPC.

The figures and descriptions provided herein may have been simplified to illustrate aspects that are relevant for a clear understanding of the herein described apparatuses, systems, and methods, while eliminating, for the purpose of clarity, other aspects that may be found in typical similar devices, systems, and methods. Those of ordinary skill may thus recognize that other elements and/or operations may be desirable and/or necessary to implement the devices, systems, and methods described herein. But because such elements and operations are known in the art, and because they do not facilitate a better understanding of the present disclosure, for the sake of brevity a discussion of such elements and operations may not be provided herein. However, the present disclosure is deemed to nevertheless include all such elements, variations, and modifications to the described aspects that would be known to those of ordinary skill in the art.

Embodiments are provided throughout so that this disclosure is sufficiently thorough and fully conveys the scope of the disclosed embodiments to those who are skilled in the art. Numerous specific details are set forth, such as examples of specific components, devices, and methods, to provide a thorough understanding of embodiments of the present disclosure. Nevertheless, it will be apparent to those skilled in the art that certain specific disclosed details need not be employed, and that embodiments may be embodied in different forms. As such, the disclosed embodiments should not be construed to limit the scope of the disclosure. As referenced above, in some embodiments, well-known processes, well-known device structures, and well-known technologies may not be described in detail.

The terminology used herein is for the purpose of describing particular embodiments only and is not intended to be limiting. For example, as used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The steps, processes, and operations described herein are not to be construed as necessarily requiring their respective performance in the particular order discussed or illustrated, unless specifically identified as a preferred or required order of performance. It is also to be understood that additional or alternative steps may be employed, in place of or in conjunction with the disclosed aspects.

When an element or layer is referred to as being "on", "upon", "connected to" or "coupled to" another element or layer, it may be directly on, upon, connected or coupled to the other element or layer, or intervening elements or layers may be present, unless clearly indicated otherwise. In contrast, when an element or layer is referred to as being "directly on," "directly upon", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). Further, as used herein the term "and/or" includes any and all combinations of one or more of the associated listed items.

Yet further, although the terms first, second, third, etc. may be used herein to describe various elements, components, regions, layers and/or sections, these elements, components, regions, layers and/or sections should not be limited by these terms. These terms may be only used to distinguish one element, component, region, layer or section from another element, component, region, layer or section. Thus, terms such as "first," "second," and other numerical terms when used herein do not imply a sequence or order unless clearly indicated by the context. Thus, a first element, component, region, layer or section discussed below could be termed a second element, component, region, layer or section without departing from the teachings of the embodiments.

By way of non-limiting example, the aforementioned figures may demonstrate specific component types, such as a MOSFET, rather than a more generic bidirectional device, but such component choices are not intended to limit the embodiments unless otherwise indicated. That is, the figures are described in sufficient detail to enable those skilled in the art to practice the disclosure, but it is to be understood that other configurations may be utilized at least in that structural, device, and electrical characteristics changes may be made without departing from the scope of the present disclosure. The following description of exemplary embodiments is, therefore, not to be taken as limiting.

Figure 1B:
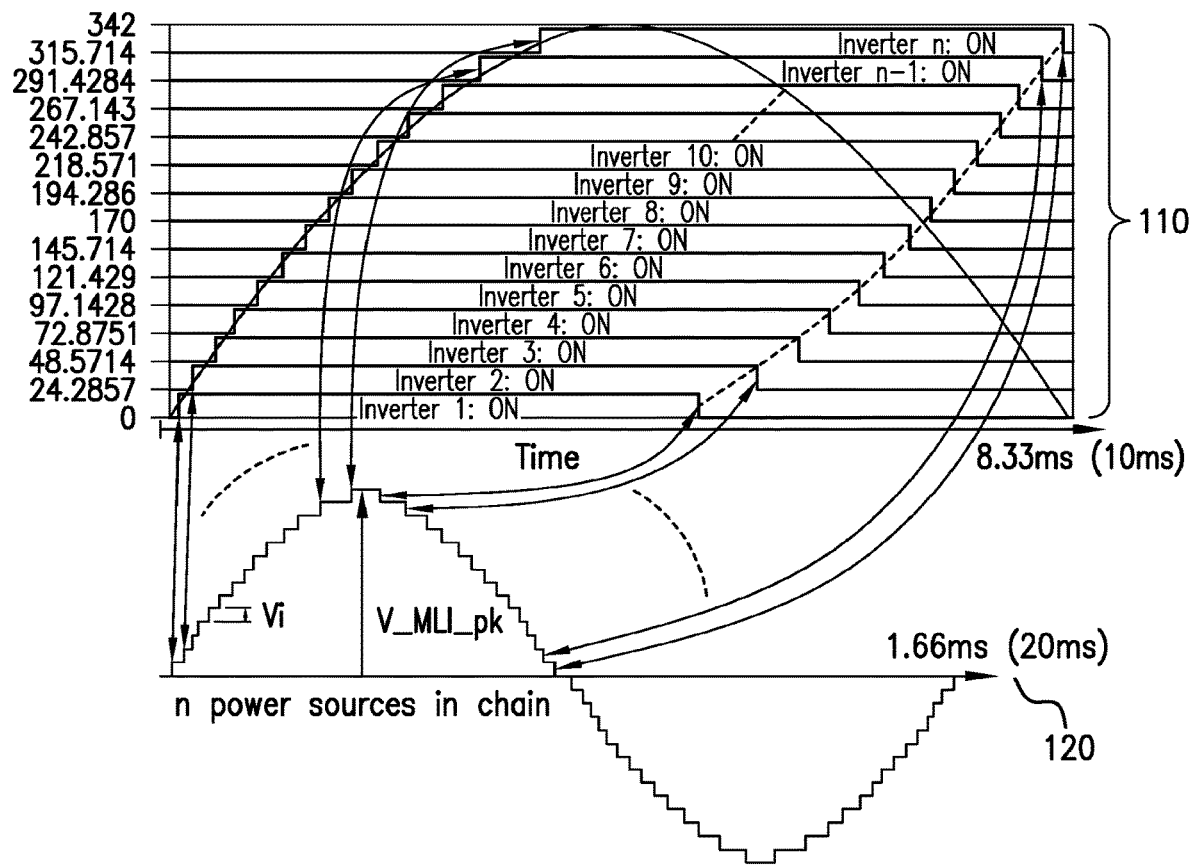
FIG. 1B shows an enlarged view of a portion of square wave outputs of individual inverters of the LV LF MLPC.

Referring to FIGS. 1A and 1B, a LV LF MLPC 100 is shown, which is suitable for generating a utility rated voltage wave, V_MLI 120, (e.g. 240Vrms, 60 Hz) by adding up n (e.g. 14) voltage sources 102, V1 . . . Vn (e.g. 24.2V), with proper phase angles, φ1 . . . φn 104. The input voltages 102 (V1, . . . , Vn) need not be equal, and in many applications may be different, as will be appreciated by the skilled artisan. Further, phase angles (φ1 . . . φn) may be equal (symmetrical or centered) or unequal (asymmetrical). Moreover, depending on the number of input power sources (n) and voltage values (V1 . . . Vn), the phase angles (φ1 . . . φn) may be adjusted to reduce the total harmonic distortion (THD) and improve balancing power drawn by individual power sources; however, the dependency of the THD on the power sources voltage values is not noteworthy, and in many cases the phase angles may be calculated off-line and considered fixed, by way of non-limiting example and as discussed further below with respect to FIGS. 12 and 13. The phase angles may be equal (symmetrical) and the pulses duty cycles (Di+ and Di−) adjusted to achieve a similar utility rated voltage waveform with a similar level of THD. Such a configuration may, however, cause more imbalanced power to be drawn from individual power sources.

Additionally, input power sources for use in the disclosed embodiments may vary. By way of non-limiting example, input power sources may include, but are not limited to, batteries, fuel cells, solar cells, and/or particularly solar panels (and/or the battery storage associated therewith).

Returning now to FIG. 1A, the power inverters 110 may be switched at a very low frequency, such as utility frequency (e.g. 50 Hz or 60 Hz); however, the switching frequency may be higher, such as 2 X, 3 X, 4 X of utility frequency. Further, since the power inverters 110 are in series, the circuit components may be low voltage, which provides benefit from low cost, fast switching speeds and low conduction losses. Also, since the disclosed inverter(s) 110 may be driven at low frequency, the switching loss, electromagnetic interferences (EMI), and common mode currents (leakage currents) may be very low. Low switching frequency also allows for adjusting voltage steps rise/fall time to further reduce the EMI and leakage current with an acceptable switching loss increment. In addition, the output voltage (V_MLI) quality (THD) is less dependent on load level and might not change over the entire load range. The output voltage, V_MLI, and output current, I, may be in phase (unity power factor), leading or lagging (non unity power factor), as shown in the bidirectional system illustrated in FIG. 1A. Optionally, a series voltage regulator 112 may be coupled (e.g., in series with) to one or more of the inverters 110 to smooth out voltage steps of the output 120. The series voltage regulator 112 may take the form of a full bridge converter or any other type of voltage regulator as known in the art.

By way of non-limiting example, for an asymmetrical case study and considering the power sources' voltages equal to 24.2 Vdc, i.e., V=[24.2V, 24.2V, . . . , 24.2V], the phase angles equal to φ=[1.8°, 6.1°, 10.5°, 14.4°, 18.9°, 23.4°, 27.9°, 32.4°, 37.8°, 43.2°, 48.6°, 55.8°, 63°, 75.6°], the high side devices duty cycles equal to D+=D−=[28.5%, 30.8%, 31.6%, 32.5%, 32.75%, 33%, 33.25%, 33.25%, 33%, 32.75%, 32.5%, 31.6%, 30.8%, 28.5%], and the low side devices duty cycle equal to 1−D+(or 1−D−), the output voltage (V_MLI) THD will be 2.8%. Obviously, the output voltage THD is independent of the output load, which is significant as will be understood to the skilled artisan.

Assuming a 14.7A rms load semi-sine current (V_MLI=240Vrms, Rload=16.3 ohms), and knowing that all converters are in series and handle the same load current, the output power of individual converters will be different, as P=[199W, 231W, 246W, 260W, 267W, 272W, 275W, 275W, 272W, 267W, 260W, 246W, 231W, 199W], and the total power will be 3500 W. Since in a chain of series converters the sequence of turning on the converters should not impact the output voltage waveform, by way of non-limiting example, one way to balance the average power among similar power sources is to rotate the turn-on period of the converters "circularly" to make individual power source output power balanced in n (14) or n/2 (7) utility voltage cycles (e.g. at 60 Hz the cycle will be 16.66 ms).

Also by way of non-limiting example, another method for balancing power among similar power sources is described below. Assuming the input power sources voltages are controllable, then with regulating the input voltages at V=[30.9V, 26.6V, 25V, 23.8V, 23V, 22.5V, 22.3V, 22.3V, 22.5V, 23V, 23.8V, 25V, 26.6V, 30.9V] and keeping the phase angles and duty cycles equal to previous values, the output voltage THD will be 3.6% and the delivered power of individual power sources will be 250 W, (balanced powers).

As mentioned, the output voltage THD dependency on the input power sources voltages is not noteworthy, and may be readily kept under a desired value, which is allowed by typical global standards. For instance, considering the same phase angles and duty cycles for the 14 power source LV LF MLPC system 100, the THD value will be as follows for different case studies:

V=[24.2V, 24.2V, 24.2V, 24.2V, 24.2V, 24.2V, 24.2V, 24.2V, 24.2V, 24.2V, 24.2V, 24.2V, 24.2V, 24.2V]→THD=2.8%

V=[30.9V, 26.6V, 25V, 23.8V, 23V, 22.5V, 22.3V, 22.3V, 22.5V, 23V, 23.8V, 25V, 26.6V, 30.9V]→THD=3.6%

V=[30V, 16V, 13V, 32V, 20V, 15V, 10V, 33V, 38V, 24V, 24V, 12V, 36V, 24V]→THD=4.35%

V=[33V, 8V, 45V, 20V, 33V, 12V, 8V, 40V, 22V, 36V, 11V, 20V, 45V, 8V]→THD=4.4%

V=[0V, 31V, 31V, 0V, 31V, 31V, 31V, 31V, 0V, 31V, 31V, 31V, 31V, 31V]→THD=4.7%

V=[15V, 16V, 13V, 32V, 28V, 15V, 32V, 33V, 38V, 24V, 24V, 20V, 20V, 24V]→THD=4.8%

It should be noted that the above discussed low THD values may be achievable without an LV SVR (such as the LV SVR shown in FIG. 7)

Figure 2:
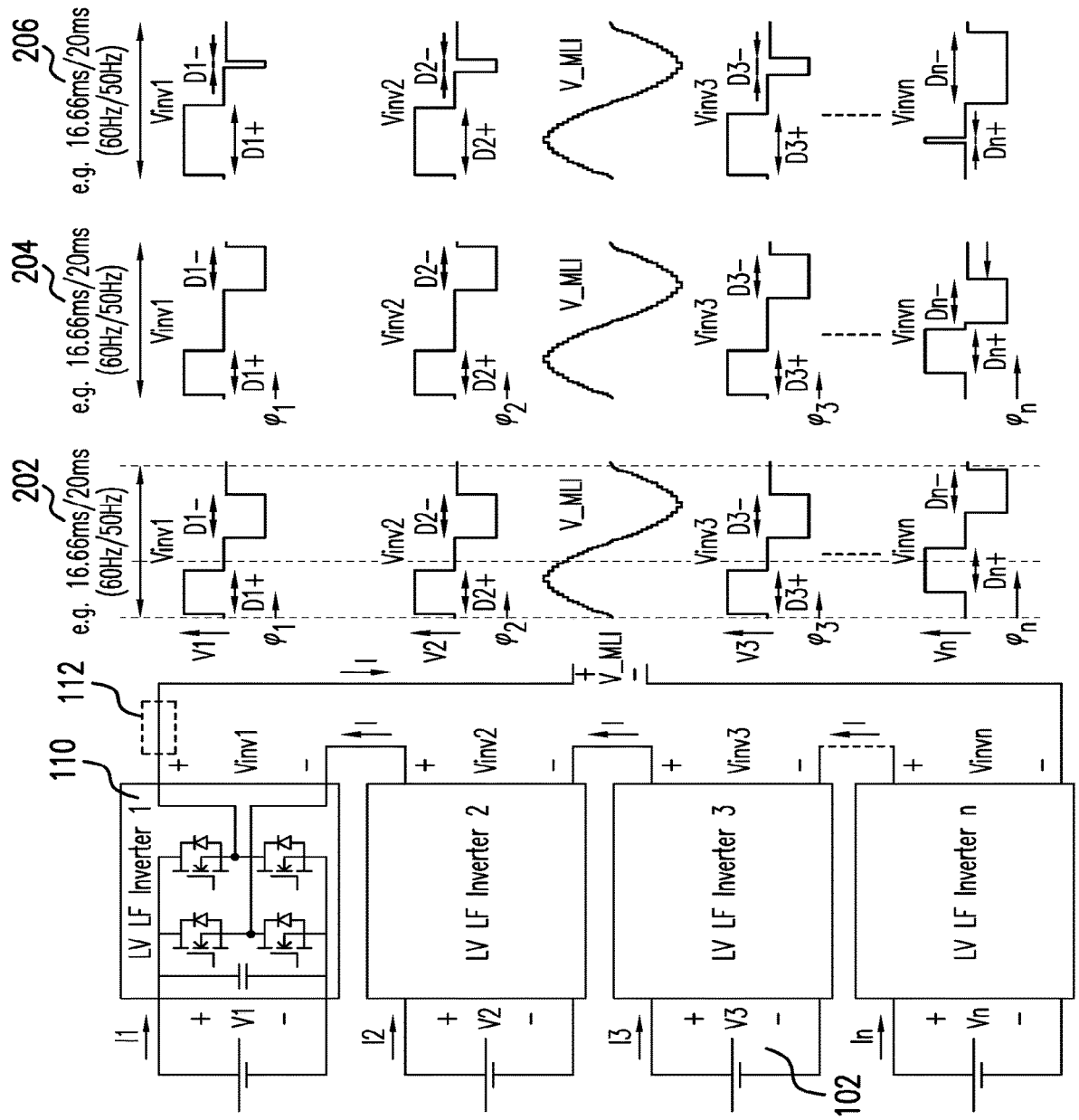
FIG. 2 shows asymmetrical and symmetrical (centered) square waves patterns.

By way of non-limiting example, FIGS. 1A and 1B demonstrate one of many patterns for creating a semi-sine voltage wave from n series LV LF inverters 110s. Relatedly, FIG. 2 demonstrates power converter turn-on patterns, asymmetrical vs. symmetrical. For example, the first two signal patterns to the left 202, 204 in FIG. 2 show asymmetrical patterns as previously described, as compared to the third pattern 206 (farthest to the right) which shows a symmetrical or centered pattern. However, all patterns may result in the same output voltage wave (V_MLI), and the major difference may be in the amount of power drawn from individual power sources. In short, an asymmetrical pattern helps to split output power more evenly among all power sources per half cycle (assuming similar power sources), and the symmetrical pattern allows splitting output power more evenly among all power sources over one or more full cycles. Since the power converters are in series as a chain in the example of FIG. 2 (i.e., the inverters are in series as illustrated), there is significant flexibility on the converters' turning-on sequence, and thus, with a circularly cyclical turn-on sequence, balancing equal power among converters with similar input power sources is highly feasible.

Figure 3:
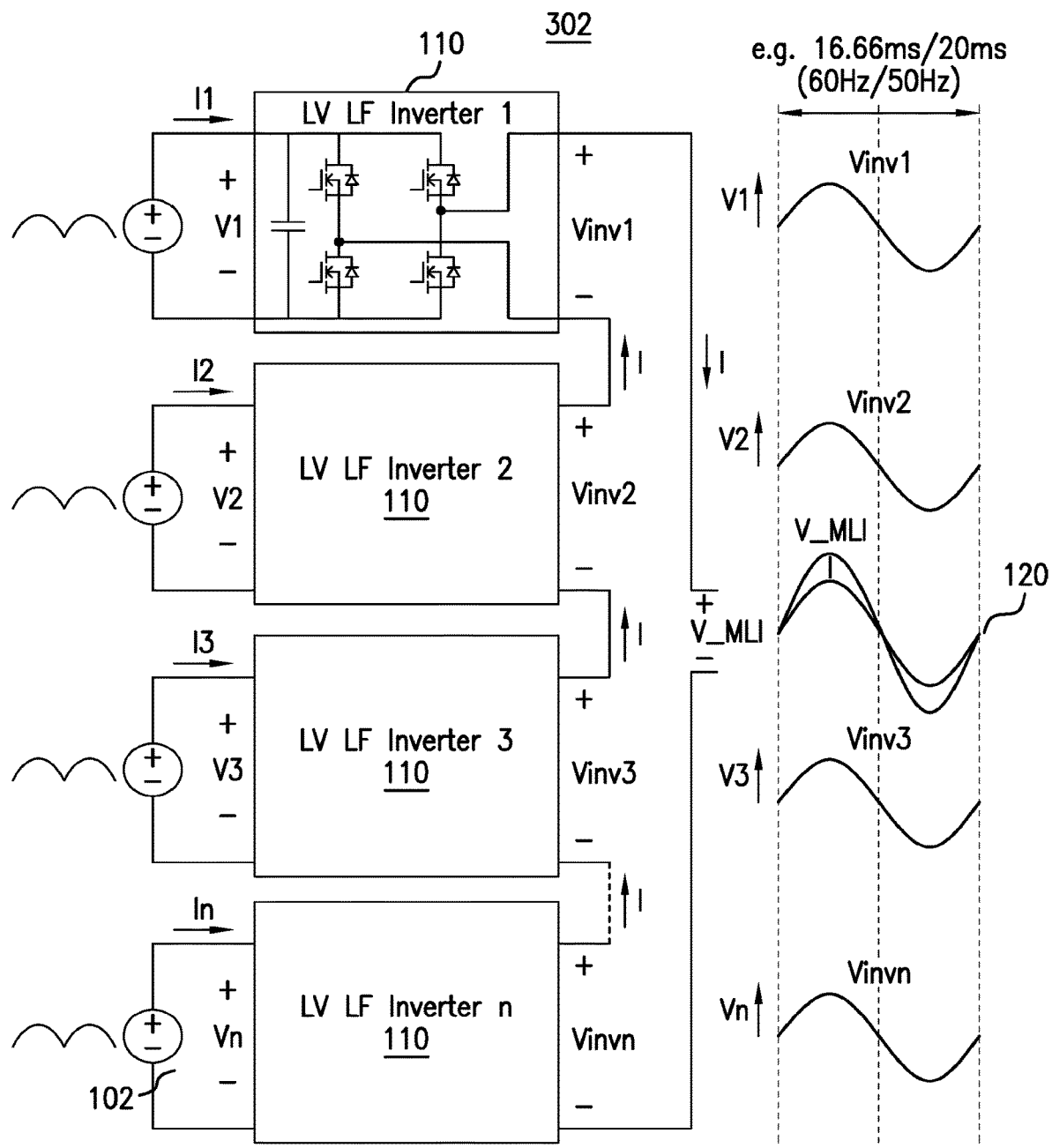
FIG. 3 shows a block diagram of a sine wave based LV LF MLPC.

FIG. 3 shows a block diagram of a sine wave based LV LF MLPC 302 suitable for generating a utility-rated voltage wave, V_MLI 120, (e.g. 240Vrms, 60 Hz) by adding up n (e.g. 14) in-phase power sources 102, i.e., V1 . . . Vn (e.g. 24Vrms). As shown in the example, all power sources are full rectified sine waves and all are at the same frequency (e.g. 120 Hz) and in phase. The difference may be the voltage magnitude and the power level sourced. The input voltages (V1, Vn) may be equal or different. Requirements may include that summed peak values meet the load rating voltage (e.g. 240Vrms). Since all inverters shown may be in series (as shown) and drive the load current, the individual power converter power delivery depends on the voltage magnitude (e.g. Vi-pk) and its phase angle with the current wave.

The sine wave based LV LF MLPC 302 may improve THD, EMI, and leakage current more than the square wave based LV LF MLPC 100 (without an LV SVR, such as the LV SVR 112 described with respect to FIG. 1A) assuming that the power source voltage is pure rectified sine wave and no current distortion at zero crossing points occurs. Of note, in the square wave based LV LF MLPC system 100, the small voltage steps of the output voltage (V_MLI) may initiate some level of THD, EMI, and leakage current. It should be noted that including an LV SVR (such as for example LV SVR 112) in series with the LV LF MLPC 100 may result in a greater improvement of THD, EMI, and leakage current more than the sine wave based LV LF MLPC 302, and, in addition, may reduce the size of utility frequency filters. Moreover, the THD may be independent of a load.

Figure 4:
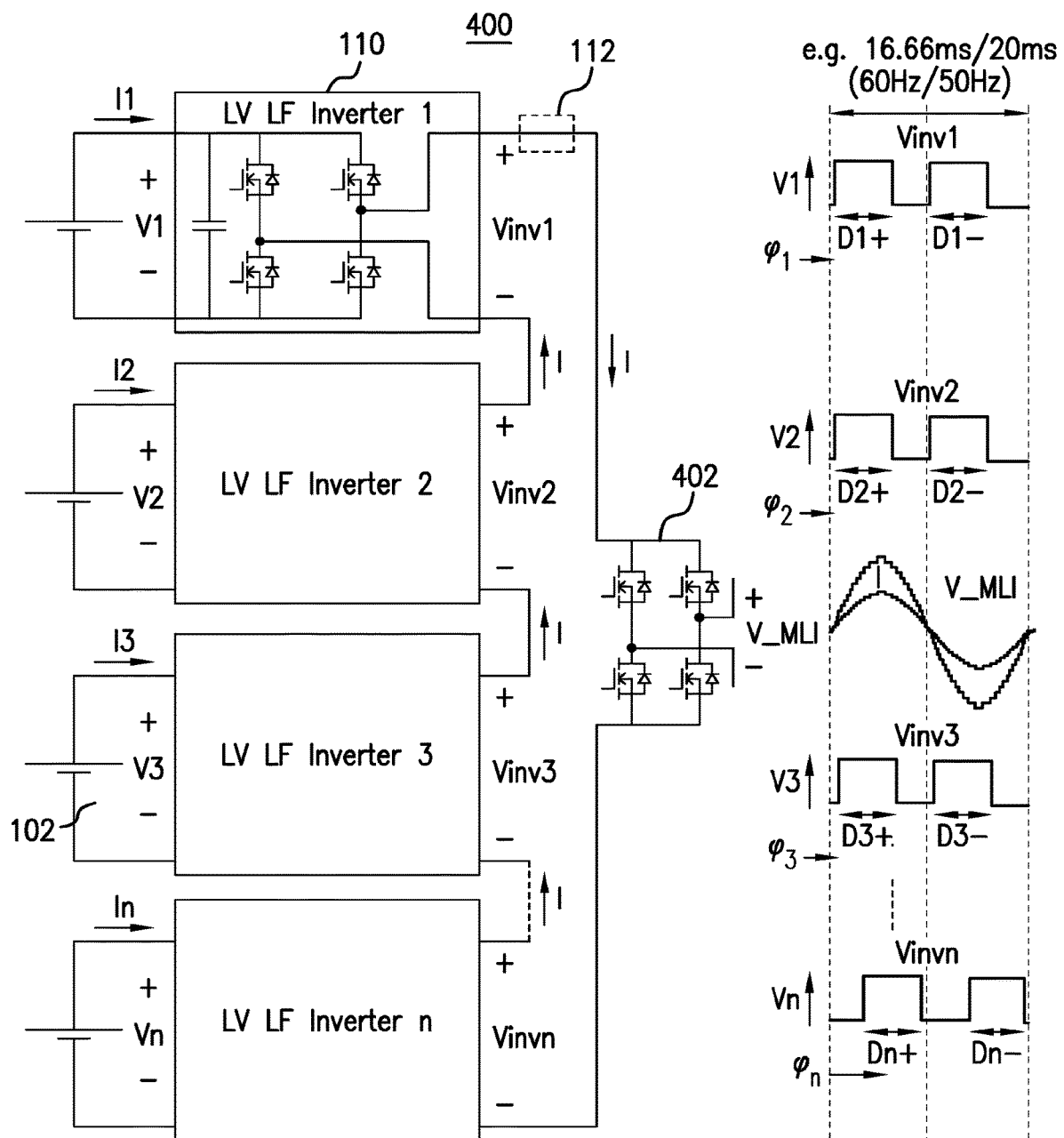
FIG. 4 shows a block diagram of a square wave based LV LF MLPC with unfolding H bridge converter.

FIG. 4 shows a block diagram of a square wave based LV LF MLPC 400 that is differentiable from the exemplary embodiment of FIG. 1A. As shown, a difference may be that the power converters 110 may use a half-bridge topology instead of an H-bridge topology. In such a case, one high voltage unfolding H-bridge converter 402 may be interfaced between the MLPC stage and the output stage to make a semi-sine wave voltage from a full rectified semi-sine wave. More particularly, the power converter 400 of FIG. 4 may provide a multi-level inverter that uses, for example, DC bus capacitors to generate a semi-sine wave. In light of the foregoing and in light of known applications for multi-level inverters, embodiments may provide a higher speed and lower dissipation in implementation than prior known efforts, such as for use with sub-100V devices.

Accordingly, the embodiments may provide multi-level inverters to effect distributed power conversion, such as may be connected via cables. Further, embodiments such as those represented in the example of FIG. 4 may use several pulse power supplies in series to thereby generate a semi-sine wave power. However, the multi-level converter 400 of FIG. 4 may nevertheless be subjected to single-center control, and parts may be integrated as compactly as practicable to avoid voltage spikes and similar inefficiencies.

Figure 5:
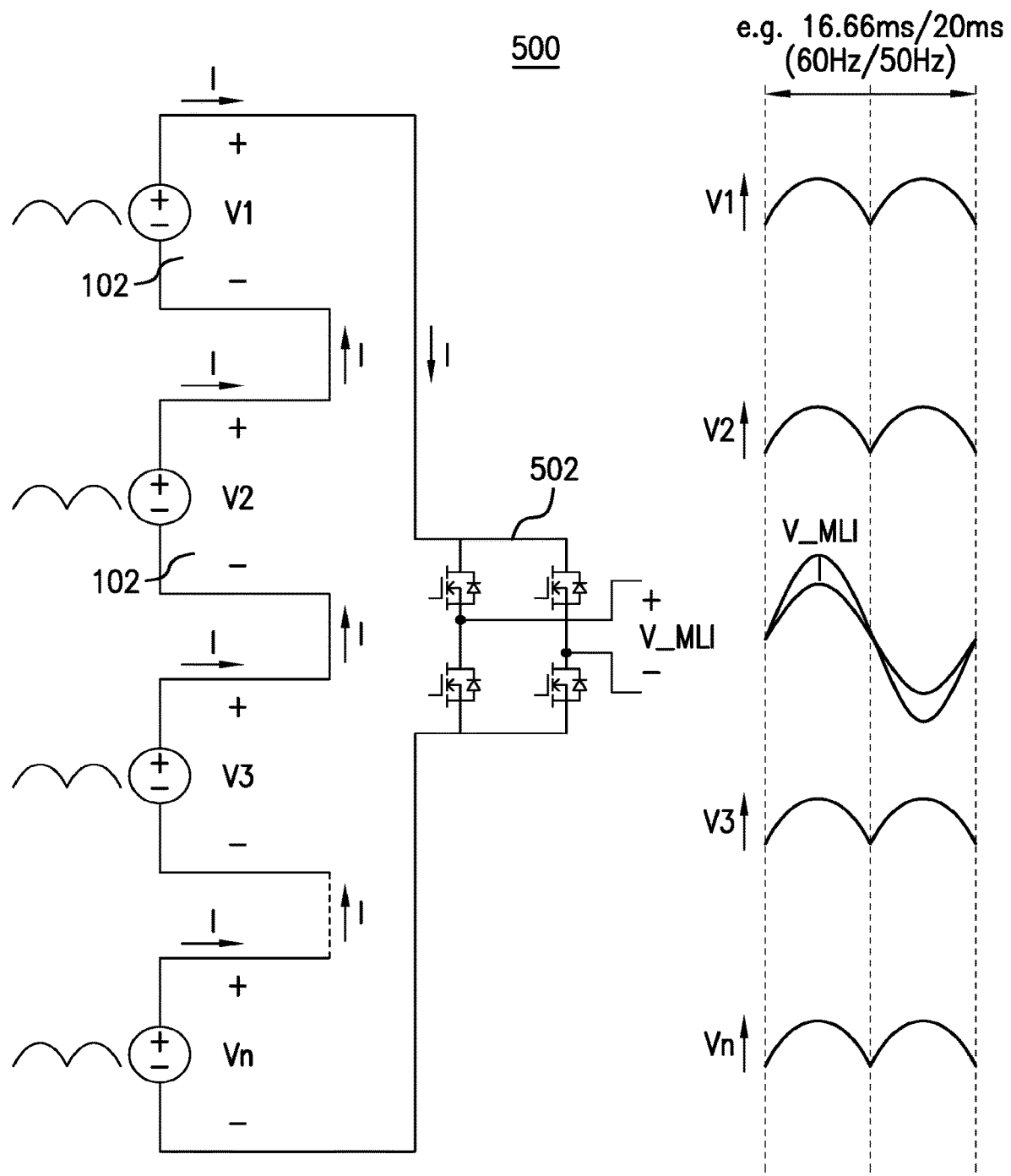
FIG. 5 shows a block diagram of a sine wave based LV LF MLPC with unfolding H bridge converter.

Moreover, in the embodiments discussed throughout, and particularly with respect to the example of FIG. 4, the wave frequency may change motor speed control, and given the fixed capacitor voltages and the need to control them, active filters may be employed in the embodiments. It goes without saying that active filters, as may be used in the disclosed applications, are appreciably less bulky, and hence more suitable and efficient in the disclosed applications, than the passive filters of the known art. Yet further, to the extent voltage source inverters are used in the known art, PWM is performed with each pulse, requiring increasingly large and expensive passive filters. However, a current source inverter may be driven by the current pulses as shown, and may use active filtering, thereby avoiding the difficulties inherent in the known art. FIG. 5 shows a block diagram of a sine wave based LV LF MLPC 500 with aspects differentiable from the example of FIG. 3. As shown, a difference is that the series LV power converters may be replaced by one high voltage unfolding H bridge converter 502 interfaced between the series power sources and the output stage, such as to make a sine wave voltage from a full rectified sine wave.

Figure 6:
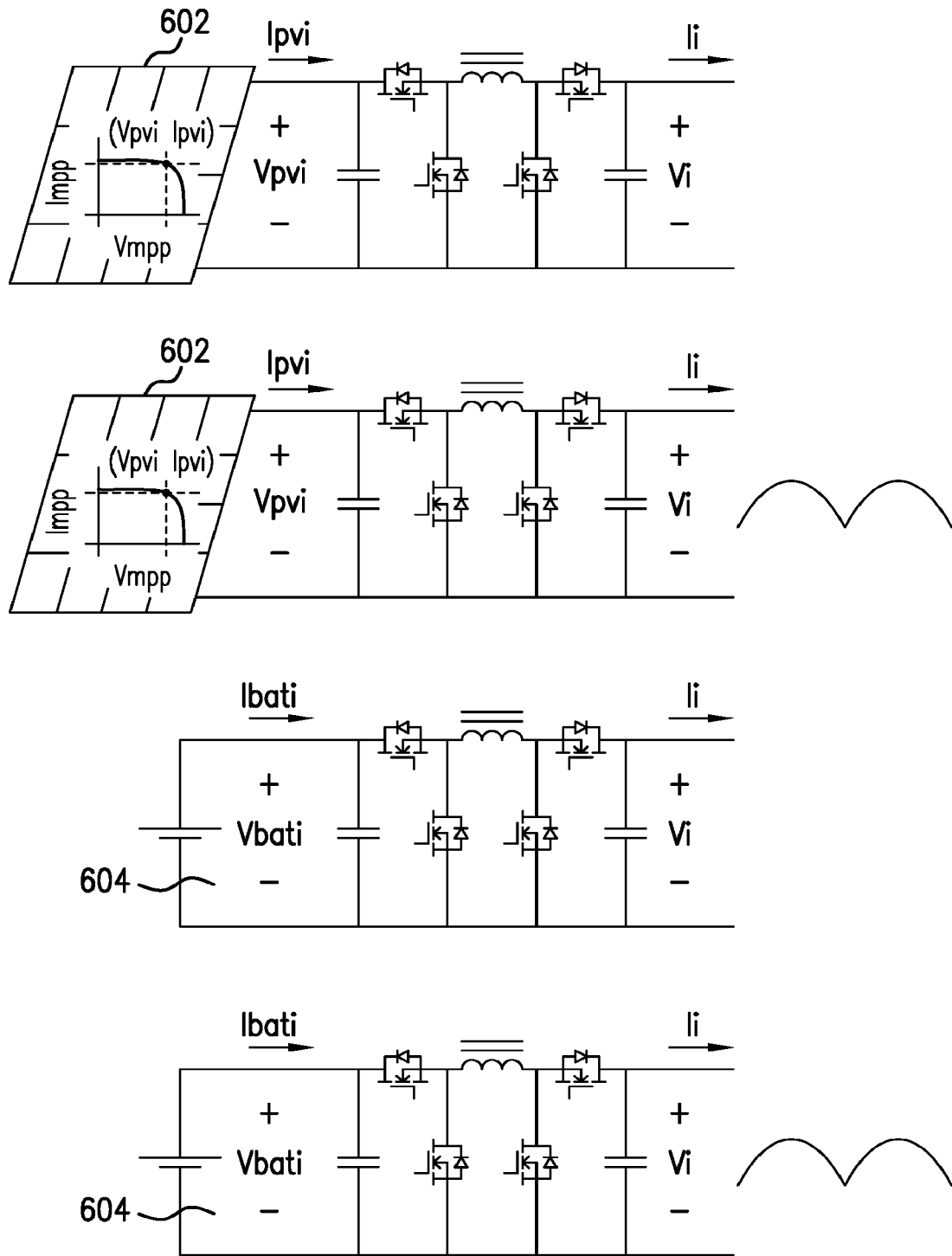
FIG. 6 shows examples of power source configurations as input to the LV LF PC.

FIG. 6 demonstrates a few of many prospective input power sources. By way of non-limiting example, the power source to the individual power converters may be a PV panel 602 or a battery 604. To utilize a PV panel at its maximum deliverable power operating point, a power optimizer or maximum power point tracker may be desired. There are many different power converter topologies that may implement MPPT to PV panels. As a non-limiting example, a single inductor buck-boost converter with DC or sine rectified output voltage may be such a converter.

Moreover, to utilize a battery in an efficient way, depending on the battery chemistry, different charge cycles are recommended by battery manufacturers. To fulfill the recommendations, different types of power converters can be utilized. As a non-limiting example, a single inductor buck-boost converter with DC or rectified sine output voltage may be used. For battery charging, the input power source and load may exchange their roles and thus the power and current flow direction may be opposite. In the case of using bidirectional devices (e.g. MOSFETs), the current can flow in both directions, and since the single inductor buck-boost converter is a symmetrical circuit, there is no difference in the case of opposite power flow as long as components' voltage and current ratings are considered.

Figure 7A:
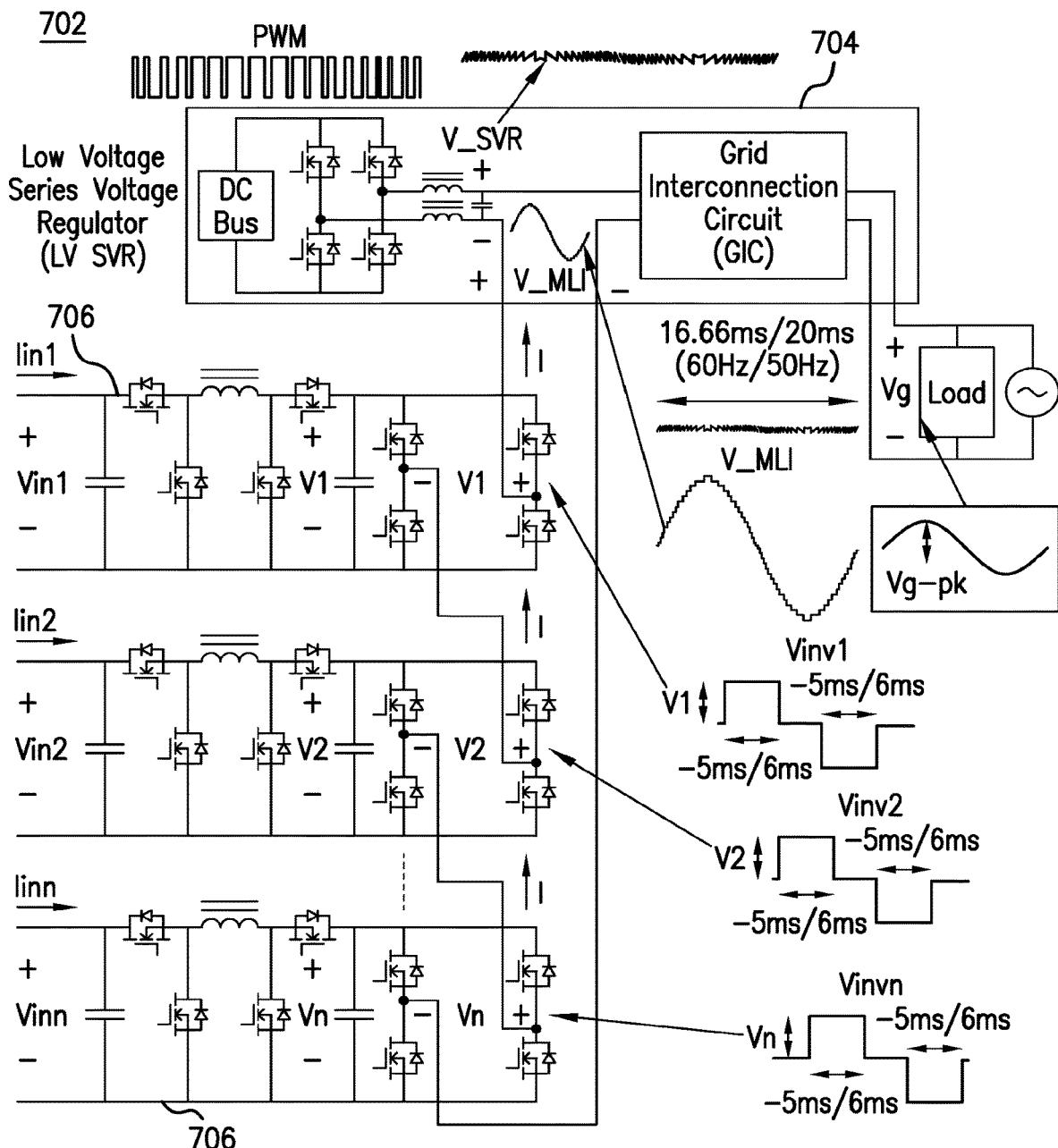
FIG. 7A shows a non-limiting example of a LV LF MLPC for regulating output voltage.
Figure 7B:
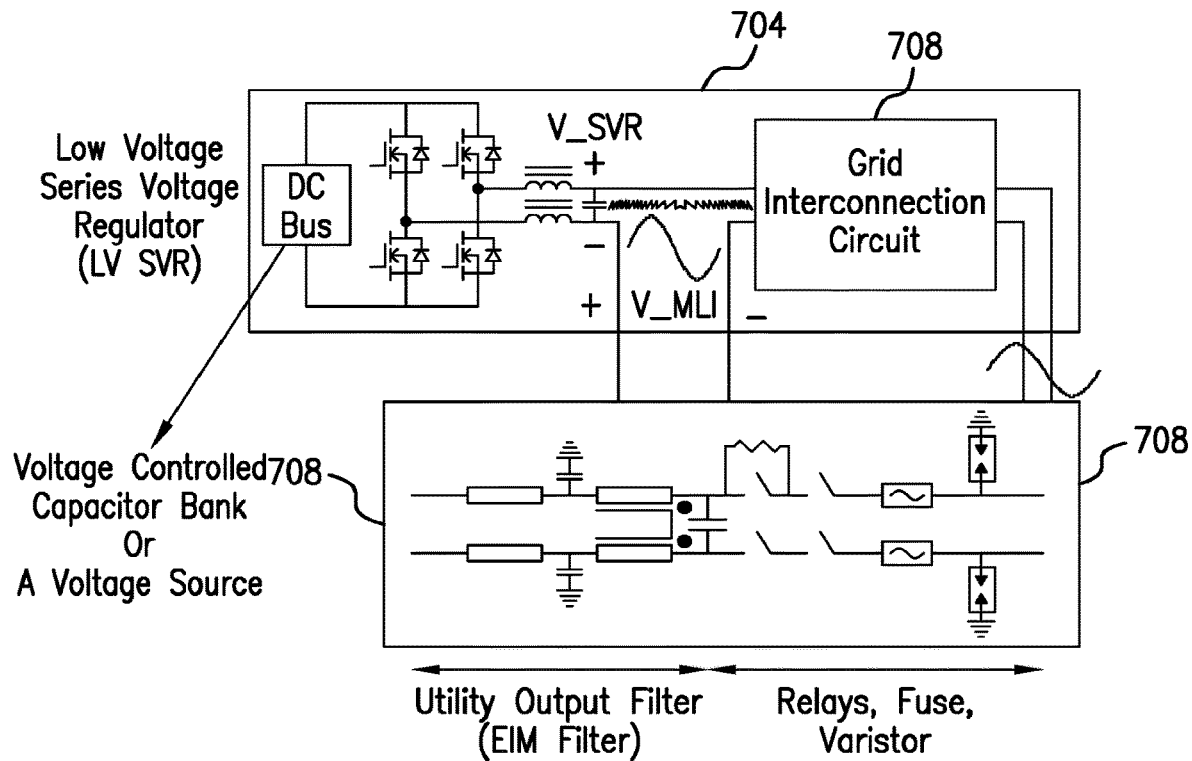
FIG. 7B shows an enlarged view of the LV SVR and grid interconnection circuit.
Figure 8:
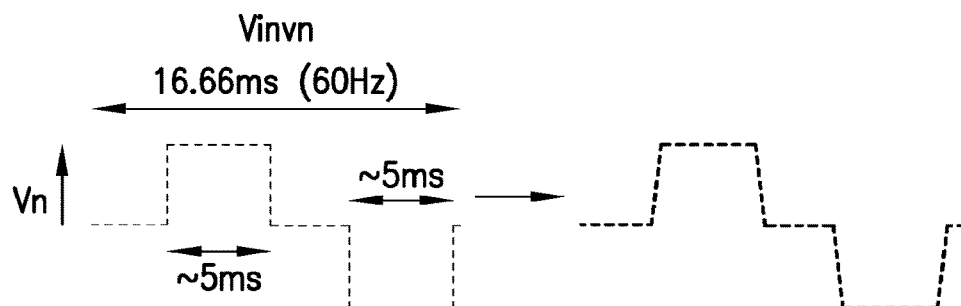
FIG. 8 shows rise/fall times of step voltages of a square wave output of an inverter of the LV LF MLPC.

FIG. 7A shows a non-limiting example of a LV LF MLPC 702, for regulating output voltage and smoothing out the voltage steps in the LV LF MLPC output voltage Vg. The LV LF MLPC 702 may be connected in series with a low voltage series voltage regulator (LV SVR) 704 demonstrated in FIG. 7 to smooth out the voltage steps of the LV LF MLPC output voltage wave Vg. This LV SVR 704, along with the LV LF MLPC 702 generates a semi-sine wave that may improve load current THD significantly. Also, the LV SVR 704 may have a quick response time. Thus, the LV SVR 704 may respond to grid transient needs and block their impacts on the LV LF MLPC performance. In case of connection to photovoltaic (PV) panels, in response to quick sun light variation or shade before the control system can response accordingly, the LV SVR 704 may compensate for differences between the desired output voltage and the voltage Vg that LV LF MLPC 702 can deliver temporarily. Subsequently, the LV LF MLPC 702 re-adjusts itself and takes over and brings back the operation to normal mode. Since the LF inverters 706 (the H-bridge (4 MOSFETs)) are driven at low frequency, e.g. 60 Hz, the switching loss is not a concern, so slowing the switching time may be feasible without a considerable switching loss increment. This slowed switching time may slow the rise/fall times of the step voltages as shown in FIG. 8 and may help the LV SVR control system 704 to command more effectively for smoothing out the step voltages out of the output voltage (semi-sine wave). Also, the LV SVR 704 may include a grid interconnection circuit 708 to facilitate integration with the grid. An enlarged view of the grid interconnection circuit 708 showing components thereof, is shown in FIG. 7B.

Figure 9:
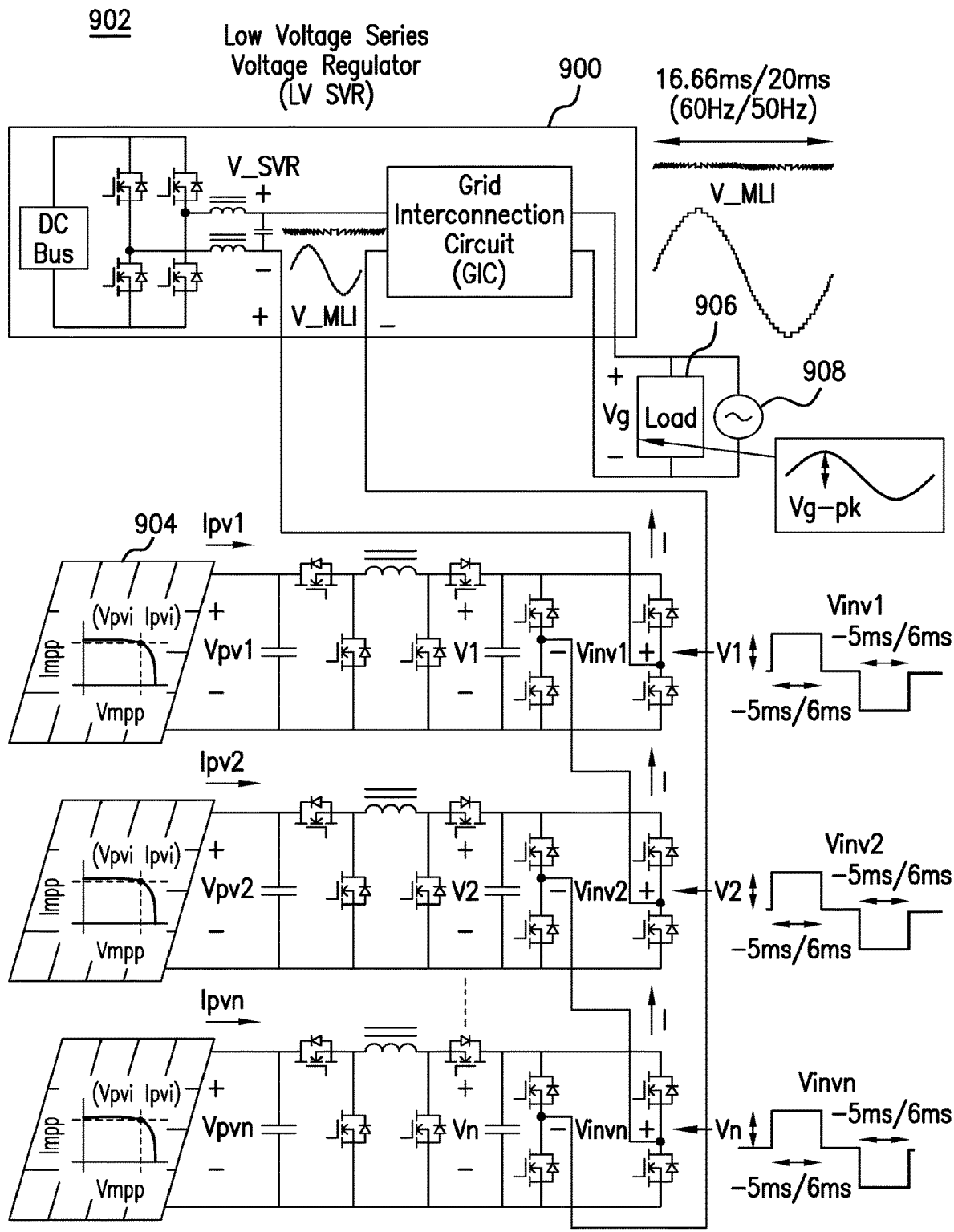
FIG. 9 shows a high level connection of an LV SVR 900 between the LV LF MLPC connected to PV panels and a load and grid.

FIG. 9 demonstrates a high level connection of an LV SVR 900 between the LV LF MLPC 902 connected to PV panels 904 and a load 906 and grid 908. In this configuration, the DC bus 910 may be a regulated DC bus capacitor bank or a voltage source. This LV SVR 900 also gains from low voltage and high performance power components but switching at higher switching frequency such as 100 KHz. As a result, the LV SVR 900 may employ small passive components such as magnetics and capacitors. As such the LV SVR 900 may facilitate a reduction of leakage (common mode) current between the PV panels 904 and grid 908. The structure of the PV panels 904 may result in a stray capacitor between PV cells and a panel frame. In addition to the PV panel structure, the capacitance also depends on environmental condition such as rain, dust, etc. It is known that a maximum capacitance may be up to approximately 160 nF/kW. Consequently, a high frequency leakage current may be exhibited due at least in part to suppression of voltage steps of the LV LF MLPC output voltage Vg, resulting in the utility frequency (e.g. 60 Hz) portion of the leakage current will exist after adding the LV SVR 900 which may be relatively small and may be controllable by a common mode choke.

Figure 10:
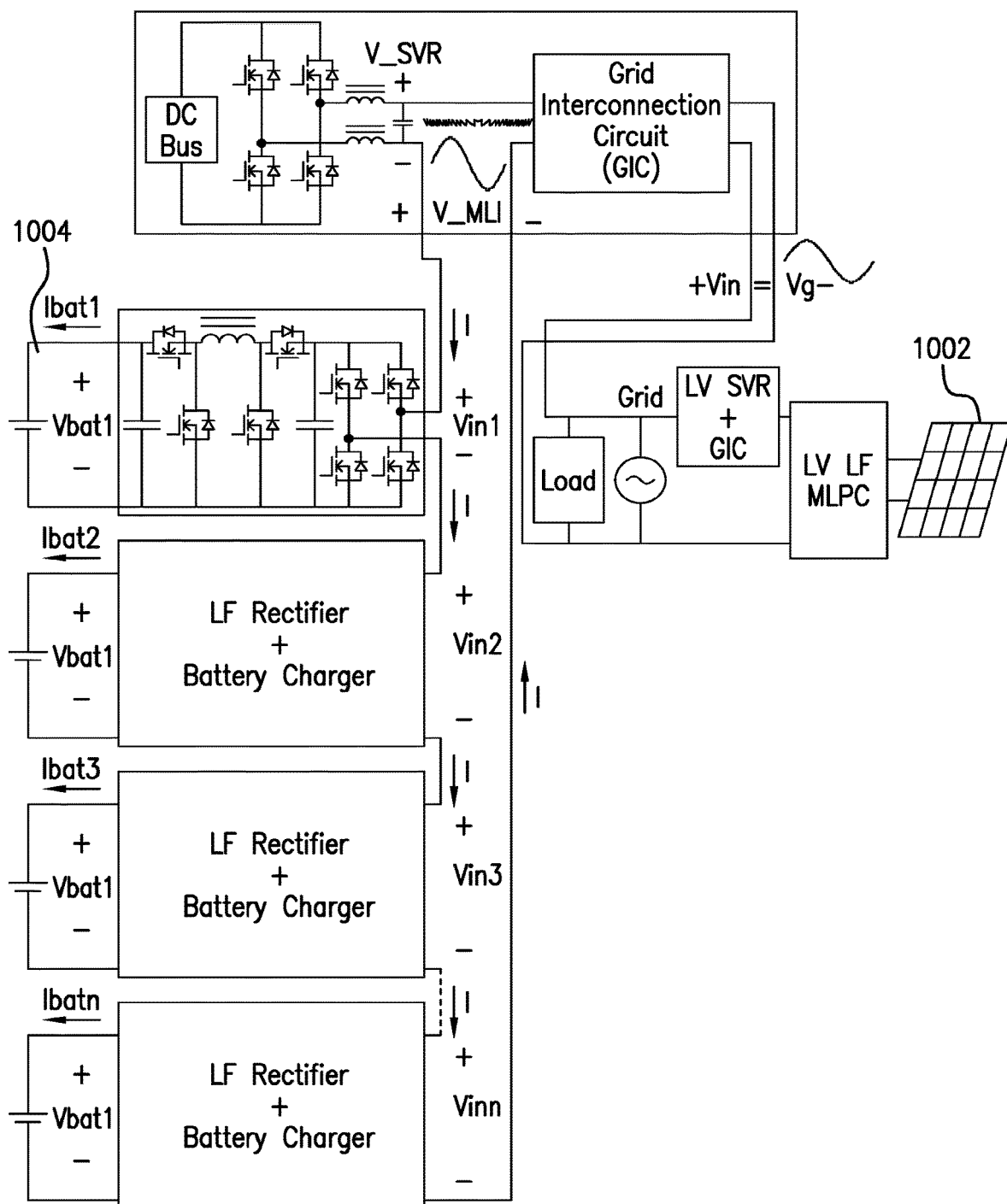
FIG. 10 shows a PV and battery storage system integrated with public utility.

FIG. 10 shows a PV 1002 and battery 1004 storage system 1000 integrated with public utility. Obviously, there are many alternatives for making such a system, and as such the example provided in FIG. 10 is non-limiting in nature. This example emphasizes that the disclosed LV LF MLPC system 1000 is a bi-directional system and may be utilized for any power flow direction. For instance, in cases having a battery as power source, during charging cycle, the battery becomes a load and the output (e.g. grid or a PV system) becomes a power source. As mentioned above, the LV LF MLPC system 1000 can thus be controlled to do the same function but in opposite direction.

Figure 11:
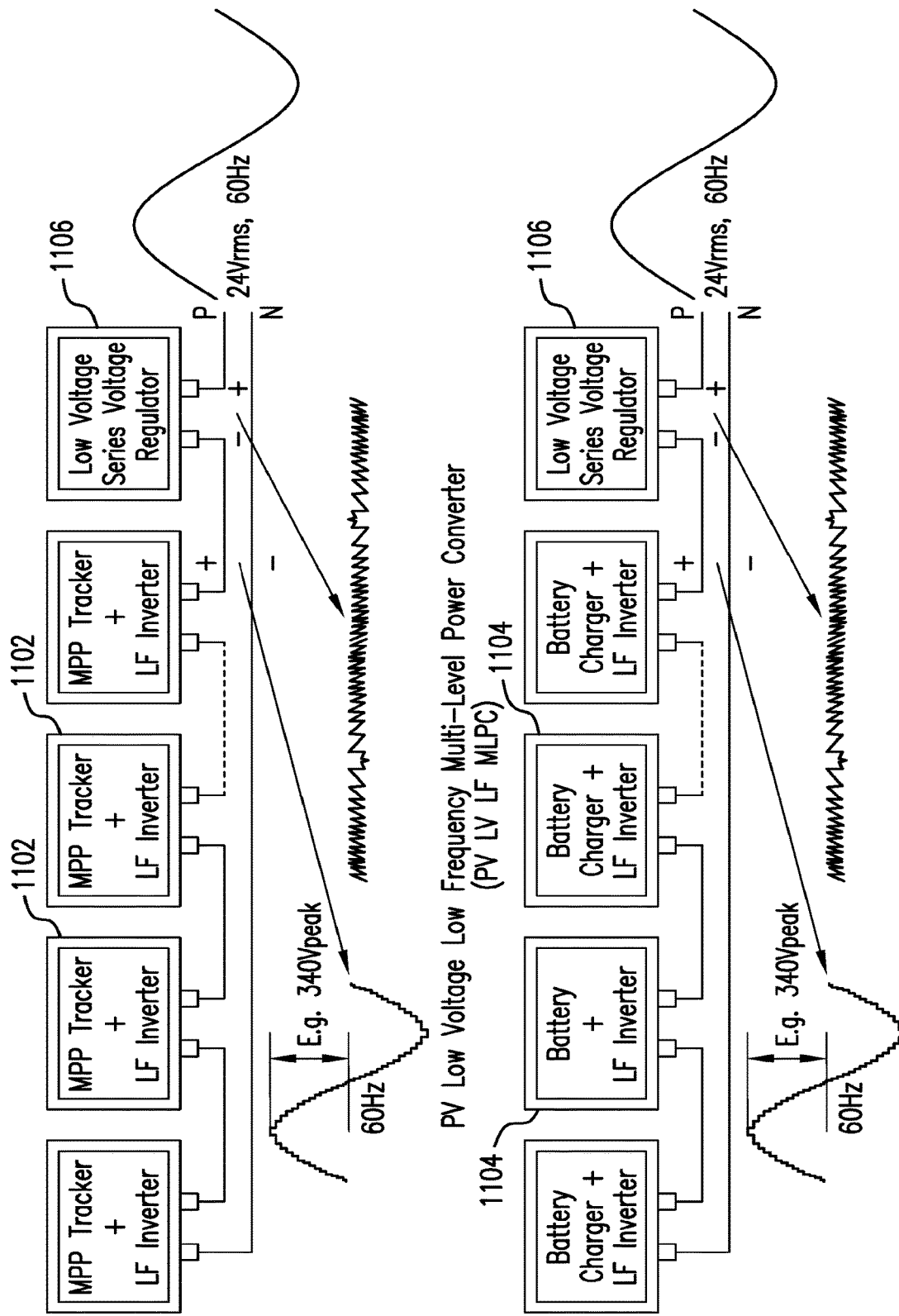
FIG. 11 shows a block diagram of integrated AC PV modules and AC battery modules in a LV LF MLPC system.

By way of non-limiting example, FIG. 11 shows block diagrams of integrated AC PV modules 1102 and AC battery modules 1104 in a LV LF MLPC system 1100. An LV SVR 1106 may be added as a module or may be integrated into another of the modules, by way of example.

Figure 12:
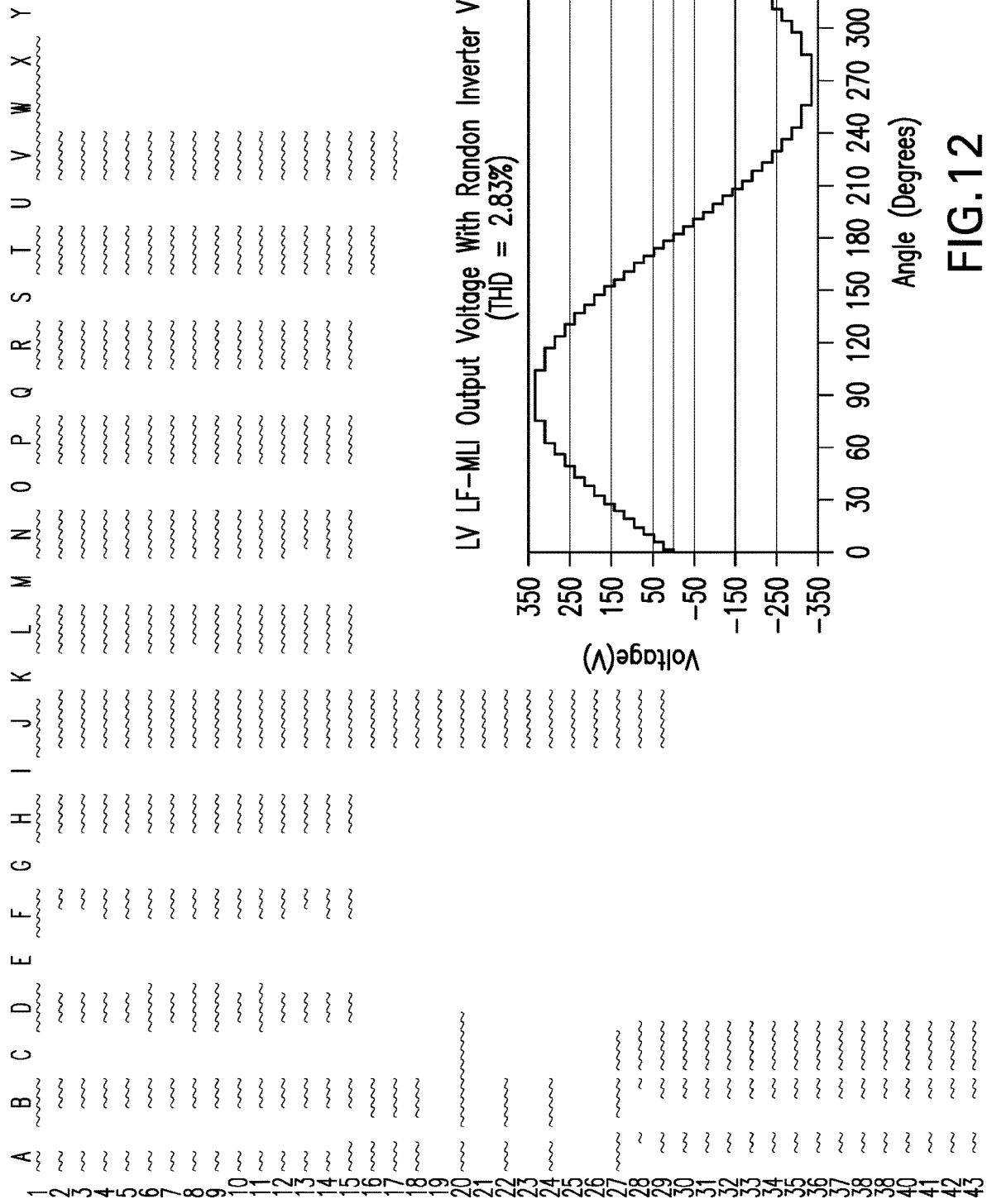
FIG. 12 illustrates an exemplary database calculation of phase shift angles.

FIG. 12 illustrates an exemplary database calculation of phase shift angles, using THD as an index, to obtain semi-sine waves in the form of phase shifted square waves pursuant to the disclosed embodiments. At least because of square-waves, real time but at low frequency (e.g. 60 Hz) THD calculation is easily achievable and may be used for avoiding off line phase shift angles calculation and update optimal angles in real time mode whenever needed. To explore this task burden, Series Fourier and THD calculation may be developed for the 14 PV panel system The Fourier series and THD calculation equations are shown in FIG. 13.

Figure 13:
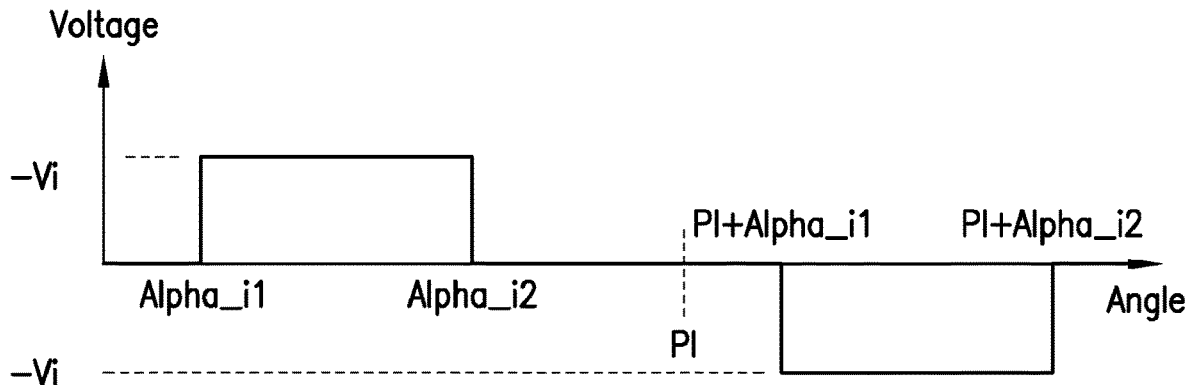
FIG. 13 illustrates an exemplary calculation of THD and optimal phase shift for certain of the embodiments.

The skilled artisan will appreciate that various methodologies to calculate THD are known, and the example provided in FIGS. 12 and 13 experientially inserts different angles to therefrom calculate the optimal angle for a given parameter (such as Vrms) in a particular application. Of course, it may be appreciated that, when the output voltage and/or number of active solar modules change, by way of example, the experiential angles used may change as well.

The descriptions of the disclosure are provided to enable any person skilled in the art to make or use the disclosed embodiments. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but rather is to be accorded the widest scope consistent with the principles and novel features disclosed herein.

What is claimed is:

1. A low voltage, low frequency multi-level power converter capable of power conversion, comprising:
   a low voltage, low frequency circuit, comprising:
      a plurality of low voltage source inputs;
      a plurality of phase-shifting inverters in series, each of the plurality of phase-shifting inverters being configured to:
         receive at least one of the plurality of low voltage source inputs, and
         generate at least one square wave output; and
   at least one secondary smoothing voltage regulator that derives and smooths a semi-sine wave output from the generated at least one square wave output.

2. The power converter of claim 1, wherein at least one of the low voltage source inputs is a semi-direct current (DC) power source.

3. The power converter of claim 1, further comprising at least one series voltage regulator in series with at least one of the plurality inverters.

4. The power converter of claim 1, wherein a level of total harmonic distortion of the power converter is less dependent on a load driven by the power converter.

5. The power converter of claim 3, further comprising a grid interconnection circuit including an output filter.

6. The power converter of claim 1, wherein the plurality of low voltage source inputs comprises a plurality of photovoltaic (PV) modules, each of the plurality of PV modules being coupled to a photovoltaic panel.

7. The power converter of claim 6, wherein each of the plurality of PV modules comprises at least one of a maximum power point tracking system, a rapid shut down circuit, and an arc fault protection circuit.

8. The power converter of claim 7, wherein the PV module includes an operational mode with a maximum power point voltage value substantially matching an inverter desired input voltage.

9. The power converter of claim 8, wherein the PV module stores energy at an inverter dc bus capacitor.

10. The power converter of claim 1, wherein at least one of the plurality of the low voltage source inputs consists of one selected from at least one battery, fuel cells, and solar cells.

11. The power converter of claim 1, further comprising integration circuitry capable of electrically integrating at least one of the plurality of low voltage source inputs with the plurality of inverters.

12. The power converter of claim 9, wherein the PV module further comprises a dedicated module-level controller.

13. The power converter of claim 12, further comprising integration circuitry capable of integrating a plurality of the PV modules.

14. The power converter of claim 1, wherein at least one of the plurality of the low voltage sources is a residential power source.

15. The power converter of claim 1, wherein at least one of the plurality of low voltage sources is a commercial power source.

16. The power converter of claim 1, wherein the semi-sine wave output is coupled to a utility grid.

17. The power converter of claim 1, wherein ones of the plurality of inverters comprise single inductor buck-boost converters.

18. The power converter of claim 17, wherein the power converter is bi-directional.

19. The power converter of claim 1, wherein ones of the plurality of inverters comprise a half bridge topology.

20. The power converter of claim 1, wherein ones of the plurality of inverters comprise an H-bridge topology.

* * * * *